(12) United States Patent
Shavell et al.

(10) Patent No.: US 10,291,730 B1
(45) Date of Patent: May 14, 2019

(54) THROTTLING PUSH NOTIFICATIONS USING PREDICTIVE WORKLOAD MODELING

(71) Applicant: SYMANTEC CORPORATION, Mountain View, CA (US)

(72) Inventors: Michael Shavell, Merrimack, NH (US); Chengi Kuo, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 246 days.

(21) Appl. No.: 15/167,670

(22) Filed: May 27, 2016

(51) Int. Cl.
*H04L 29/06* (2006.01)
*H04L 29/08* (2006.01)
*H04L 12/911* (2013.01)
*H04M 15/00* (2006.01)

(52) U.S. Cl.
CPC ............ *H04L 67/26* (2013.01); *H04L 47/748* (2013.01); *H04M 15/60* (2013.01)

(58) Field of Classification Search
CPC .... H04L 67/26; H04L 47/748; H04W 68/005; H04W 4/02; H04W 4/80; H04M 15/60
See application file for complete search history.

(56) References Cited

U.S. PATENT DOCUMENTS

| | | | | |
|---|---|---|---|---|
| 7,760,680 | B2* | 7/2010 | Chen | H04L 47/14 370/328 |
| 9,461,955 | B1* | 10/2016 | Sherrets | H04L 51/32 |
| 9,603,056 | B2* | 3/2017 | Luna | H04W 28/10 |
| 9,774,696 | B1* | 9/2017 | Calvert | H04L 67/26 |
| 2009/0327491 | A1* | 12/2009 | Tran | G06F 15/173 709/225 |
| 2014/0074925 | A1* | 3/2014 | Budin | G06Q 10/10 709/204 |
| 2016/0149826 | A1* | 5/2016 | Pak | H04N 21/23113 709/226 |
| 2017/0206116 | A1* | 7/2017 | Reque | G06F 9/5077 |

* cited by examiner

*Primary Examiner* — Chirag R Patel
(74) *Attorney, Agent, or Firm* — Patterson + Sheridan, LLP

(57) ABSTRACT

The present disclosure relates to managing a rate of generating data requests to be processed at a service provider. An example method generally includes detecting an instance of a push notification event directed to a group of endpoint systems. The push notification event generally indicates that push notifications are to be transmitted to the group of endpoint systems to generate the data requests. A computing system determines a resource utilization associated with at least one of the data requests generated based on the push notification event and determines a push notification transmission rate based on the determined resource utilization and computing resources available at the service provider. The rate generally indicates a number of push notifications to generate and transmit over a period of time. The computing system transmits the push notifications to the group of endpoint systems based on the calculated push notification transmission rate.

20 Claims, 5 Drawing Sheets

THROTTLING PUSH NOTIFICATIONS USING PREDICTIVE WORKLOAD MODELING

BACKGROUND

Field

Embodiments presented herein generally relate to processing push notifications, and more specifically to adapting a frequency at which push notifications are generated and transmitted to endpoint systems based on resources available to process requests related to the push notifications.

Description of the Related Art

In cloud-based computing systems, push notifications can be used to trigger endpoint devices (e.g., client devices) to perform an action in relation to a cluster of servers associated with a service provider. For example, a push notification can instruct an endpoint device to establish a connection with a specified service provider and request an updated data set from the specified service provider. Generating and transmitting push notifications to endpoint devices may be a "lightweight" process, or a process that requires the use of relatively few resources (e.g., processor cycles, bandwidth, and so on). Because push notifications generally involve lightweight processes, a push notification system can output a large number of push notifications without overloading the computing resources available at the push notification system.

Servicing requests generated by an endpoint device in response to a push notification, however, may use a varying amount of computing resources. For example, a request for a small log file may be inexpensive (e.g., require the use of a small number of processor cycles or network bandwidth). A request that involves multiple requests for data from a service provider (e.g., multiple database queries) may be expensive (e.g., require the use of a large number of processor cycles or a large amount of bandwidth).

Service providers are generally configured as a set of one or more servers that can respond to data requests received from an endpoint system. Each service provider may process a limited number of requests for data based on the amount of resources available to a service provider and the amount of resources needed to process a request targeting the service provider. When the number of requests received at the service provider exceeds the number of requests that the service provider can process, endpoint systems may experience increased latency or may not receive a response to a request (e.g., due to request timeout periods expiring, service providers going offline because of traffic loading, and so on).

SUMMARY

One embodiment of the present disclosure includes a method for managing a rate of generating data requests to be processed at a service provider. The method generally includes detecting an instance of a push notification event directed to a group of endpoint systems. The push notification event generally indicates that push notifications are to be transmitted to the group of endpoint systems to generate the data requests. A computing system determines a resource utilization associated with at least one of the data requests generated based on the push notification event and determines a push notification transmission rate based on the determined resource utilization and computing resources available at the service provider. The rate generally indicates a number of push notifications to generate and transmit over a period of time. The computing system transmits the push notifications to the group of endpoint systems based on the calculated push notification transmission rate.

Another embodiment provides a computer-readable storage medium having instructions, which, when executed on a processor, performs an operation for managing a rate of generating data requests to be processed at a service provider. The operation generally includes detecting an instance of a push notification event directed to a group of endpoint systems. The push notification event generally indicates that push notifications are to be transmitted to the group of endpoint systems to generate the data requests. A computing system determines a resource utilization associated with at least one of the data requests generated based on the push notification event and determines a push notification transmission rate based on the determined resource utilization and computing resources available at the service provider. The rate generally indicates a number of push notifications to generate and transmit over a period of time. The computing system transmits the push notifications to the group of endpoint systems based on the calculated push notification transmission rate.

Still another embodiment of the present invention includes a processor and a memory storing a program, which, when executed on the processor, performs an operation for managing a rate of generating data requests to be processed at a service provider. The operation generally includes detecting an instance of a push notification event directed to a group of endpoint systems. The push notification event generally indicates that push notifications are to be transmitted to the group of endpoint systems to generate the data requests. A computing system determines a resource utilization associated with at least one of the data requests generated based on the push notification event and determines a push notification transmission rate based on the determined resource utilization and computing resources available at the service provider. The rate generally indicates a number of push notifications to generate and transmit over a period of time. The computing system transmits the push notifications to the group of endpoint systems based on the calculated push notification transmission rate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein provide techniques for managing workloads at service providers that receive requests generated from push notifications received at an endpoint device. A workload analyzer can determine (e.g., based, at least in part, on historical data) an amount of resources needed to satisfy a request generated from a push notification received at an endpoint device. Based on the total amount of resources needed to satisfy the request and resource availability at a designated service provider, a workload analyzer can determine a frequency of transmitting push notifications to a plurality of endpoint systems. A push notification system generally transmits push notifications to endpoint systems based on the determined frequency, and service providers can receive data requests from the notified endpoint systems at substantially the frequency at which a push notification system transmits push notifications to the endpoint systems.

Advantageously, by determining a frequency to transmit push notifications that initiate interactions with a service provider based on the resources needed to process a request associated with the push notification and available resources at the service provider, a system can dynamically adjust generating push notifications to prevent system outages. As discussed herein, a workload analyzer can determine the frequency to send push notifications, for example, to provide for substantial usage of the computing resources available at a service provider without causing service outages at the service provider. For lightweight operations, the push notification platform can transmit push notifications to endpoint systems at a relatively high rate, whereas for more resource intensive operations, the push notification platform can transmit push notifications to endpoint systems at a lower rate. By generating notifications at a rate that generally does not result in a service provider needing additional resources to satisfy data requests, push notification systems can moderate traffic at service providers. Moderating traffic at service providers generally allows service providers to respond to received requests without introducing high latencies or service unavailability due to resource-usage-based system outages.

DETAILED DESCRIPTION

Figure 1:
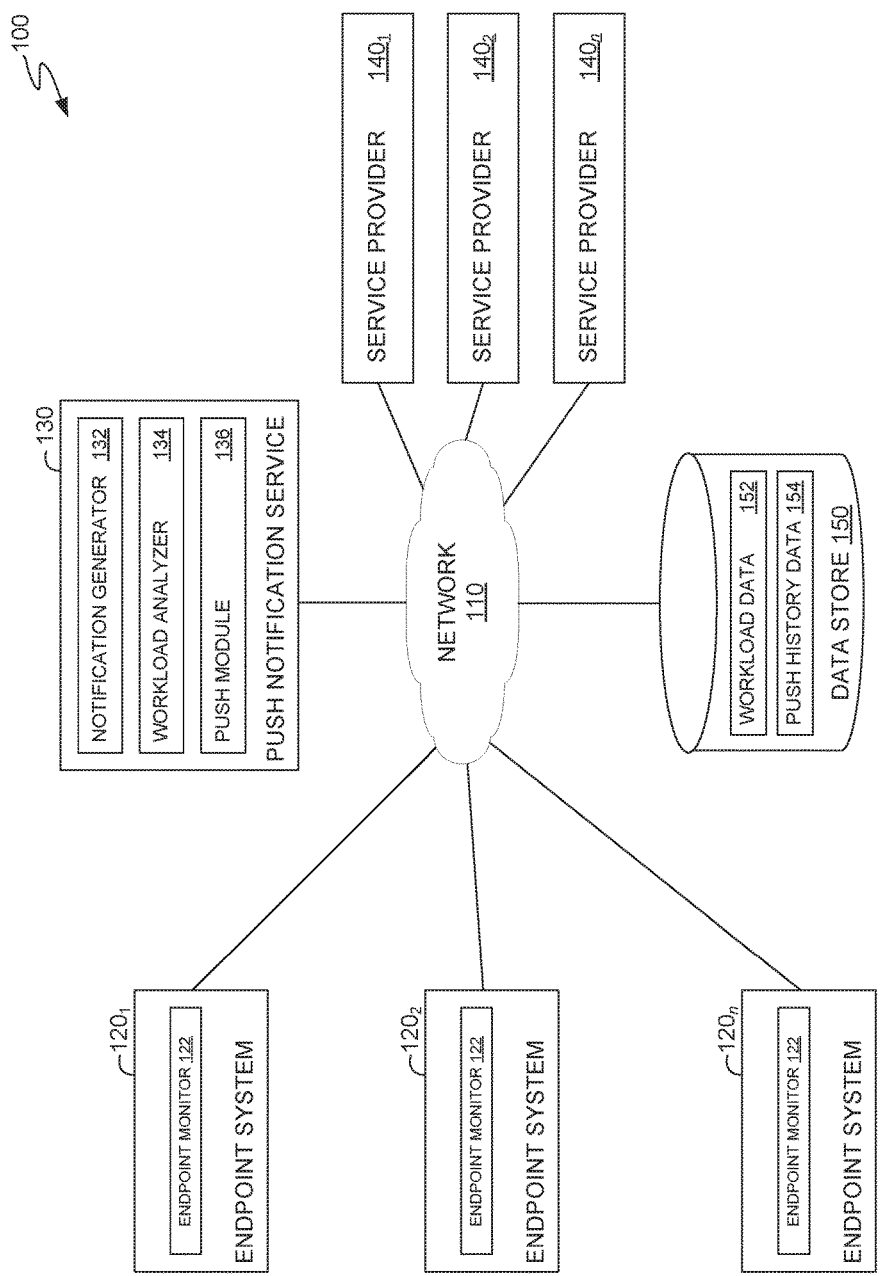
FIG. 1 illustrates an example of a networked computing environment, according to one embodiment.

FIG. 1 illustrates an example networked computing environment 100, according to an embodiment. As illustrated, computing environment 100 includes a plurality of endpoint systems 120, a push notification service 130, a plurality of service providers 140, and a data store 150.

As illustrated, each endpoint system 120 in network 110 may execute an endpoint monitor 122 locally to monitor for potential security breach events, such as rogue downloads, execution of rogue applications, exfiltration of data stored on an endpoint system 120, spam (junk e-mail) filtering, intrusion detection and prevention, and so on. Endpoint monitor 122 may be configured to apply rules obtained from a service provider to monitor for security risk events and take action (e.g., blocking network connections, quarantining files including a malicious payload, etc.) to prevent the security risk events from compromising endpoint system 120.

In some cases, endpoint monitor 122 includes an interface for receiving push notifications from push notification service 130. Endpoint monitor 122 can receive push notifications from push notification platform asynchronously. Based on data included in the push notification, endpoint monitor 122 can generate and transmit a request to one or more identified service providers 140 to obtain a specified set of data from the identified service providers 140. In some cases, the push notification may include information identifying data that endpoint monitor 122 should include in a request transmitted to the one or more identified service providers 140, such as data identifying endpoint system 120 (e.g., a globally unique identifier of endpoint system 120), a datestamp indicating the last time endpoint system 120 contacted the one or more identified service providers 140, and so on.

In response to the request, endpoint monitor 122 generally receives data from one or more service providers to use in monitoring for security risk events at endpoint system 120. The data may be, for example, a library of threat signatures (e.g., hashes of malicious payloads carried in files), Internet Protocol addresses of malicious destinations, and so on.

Push notification service 130 generally transmits messages to multiple endpoint systems 120 to trigger each of the endpoint systems to request data from one or more service providers 140. As illustrated, push notification service 130 generally includes a notification generator 132, workload analyzer 134, and push module 136.

Notification generator 132 is generally configured to detect a push notification event for one or more service providers 140 and generate one or more push notifications to be transmitted to one or more endpoint systems 120. As discussed above, the push notifications generated by notification generator 132 may indicate that an endpoint system 120 is to request a specified piece of data from an identified service provider 140. Push notifications may be relatively small messages push notification service 130 can generate and transmit using a small amount of resources (e.g. processor cycles and network bandwidth).

Push notification events may be generated, for example, when new security threat definitions are published for malware detection systems, when updated reputation data is available for reputation-based endpoint security systems, and so on. To detect a push notification event, notification generator 132 can, for example, receive data from one or more service providers 140 indicating that endpoint systems 120 should contact the service providers 140 to obtain updated information for a specific service (e.g., anti-malware, intrusion prevention, anti-spam, and so on). In some cases, notification generator 132 can receive a lightweight message indicating that a service provider 140 has updated data to provide to one or more endpoint systems 120. In some cases, service providers 140 may generate push notification events with additional data that push notification service 130 can use to determine a rate to send push requests to the endpoint systems 120 (and correspondingly, a rate at which an identified service provider 140 can expect to receive requests for data from the endpoint systems 120).

Workload analyzer 134 is generally configured to determine an amount of resources a service provider 140 needs to process a request associated with a push notification event and a maximum number of requests that the service provider 140 can serve over a given timeframe, according to an embodiment. In some cases, workload analyzer 134 can determine the resources needed to process a request based, for example, on a number of database queries generated to satisfy the request, the size of a data to be returned in response to the request, the number of endpoint systems that are to respond to the push notification, and so on.

In some cases, workload analyzer 134 can retrieve, from data store 150, information about the resources available at a service provider 140. The information about resources available at a service provider 140 may include, for example, information about a number of database queries the service provider 140 can process over a given period of time, an amount of data the service provider 140 can output over a given period of time, and so on. Based on the determined resource utilization for a given request and the resources available at a service provider 140, workload analyzer 134 can determine a rate to generate and transmit push notifications to one or more endpoint systems 120. Generally, for a given amount of computing resources available at a service provider 140, workload analyzer 134 can generate and transmit push notifications at a higher rate for requests that have low resource utilization (e.g., requests satisfied using a single database query and for which the returned data set is measured in kilobytes) relative to requests that have high resource utilization (e.g., requests satisfied using multiple database queries and/or requests for which the returned data set is measured in gigabytes).

The determined rate may be defined, for example, as a number of push notifications transmitted to endpoint systems 120 per second that results in a total resource utilization at any point in time at the service provider 140 falling below the resource availability at the service provider 140. As resource availability at a service provider 140 changes (e.g., from server outages, dynamically adding server instances to a cluster associated with a service provider 140, and so on), workload analyzer 134 can adjust the rate at which push notification service 130 generates and transmits push notifications to endpoint systems 120. For example, as the number of servers available at a service provider 140 decreases (e.g., due to server outages or deallocation of temporary virtual machines from a cluster of servers associated with service provider 140), workload analyzer 134 can decrease the rate at which push notification service 130 generates and transmits push notifications to endpoint systems 120. Similarly, As the number of servers available at a service provider 140 increases (e.g., due to allocation of additional temporary virtual machine instances to a cluster associated with a service provider 140), workload analyzer 134 can increase the rate at which push notification service 130 generates and transmits push notifications to endpoint systems.

In some cases, workload analyzer 134 can use historical data related to a push notification (e.g., workload data 152 at data store 150) for a specific service provider 140 to determine an amount of resources to make available at the service provider 140 to process requests generated from a push notification. In an example, workload analyzer 134 can track which systems receive and respond to a push notification for a specific event and the amount of computing resources used to respond to the received requests (e.g., the amount of time elapsed between processing the first and last requests, a number of servers allocated to processing the requests, and so on). Based on the number of endpoint systems 120 that responded to a push notification and the number of servers allocated to processing the requests at service provider 140, workload analyzer 134 can calculate a number of servers needed to respond to the remaining endpoint systems 120. For example, assume a scenario in which 60 of 90 endpoint systems respond to a push notification generated by push notification service 130 and 10 virtual machine instances are used at service provider 140 to process the requests from the 60 endpoint systems. At a later date, to process requests generated by the remaining 30 endpoint systems (e.g., half of the 60 endpoint systems that initially responded to the push notification), workload analyzer 134 can request the use of 5 virtual machine instances (e.g., half of the 10 virtual machine instances initially used to process the push notification) to process the remaining requests.

In another example, workload analyzer 134 can use historical data about a time elapsed between successive updates requests and a number of virtual machine instances used to serve the previous update to determine a number of virtual machines needed to process a subsequent update request. For example, assume that a previous data update covered two weeks of activity log data and that 10 virtual machine instances were used to respond to requests generated by endpoint systems 120 for the previous data update. Assume that a current data update covers one week of activity log data to provide to the endpoint systems 120 (half the amount of time covered in the previous update). Based on the amount of time covered by the current data update relative to the previous data update, workload analyzer 134 can allocate (or request allocation of) 5 virtual machine instances (half of the virtual machine instances used to process the previous data update) to service provider 140 to process the current data update.

Based on the calculated push notification rate, push module 136 transmits push notifications to the one or more endpoint systems 120 in computing environment 100. In some cases, as push module 136 transmits a push notification to a specific endpoint system 120, push module 136 can generate a log entry indicating that the specific endpoint system 120 received the push notification. The log entries may be stored, for example, in push history data 154 at data store 150. As discussed above, in some cases, push notification service 130 can use the log data indicating the one or more endpoint systems 120 that received a push notification to determine a number of endpoint systems 120 that remain to be updated and, in some cases, a number of virtual machines to allocate to updating the remaining endpoint systems 120.

Service providers 140 may be clusters of physical and/or virtual servers that store data to be provided to endpoint systems. For example, service providers 140 can be update servers associated with a specific feature implemented at an endpoint monitor 122 (e.g., anti-malware, intrusion prevention, anti-spam, and so on). As updates are made available at service provider 140, service provider 140 can send a message to push notification service 130 to request that push notification service 130 initiate update procedures at endpoint systems 120. In some cases, as discussed above, workload analyzer 134 can additionally define a number of servers needed to service update requests received at service provider 140 from the one or more endpoint systems 120. The number of servers allocated to process a set of update requests from endpoint systems 120 at service provider 140 may, in some cases, vary based on calculated resource requirements for the update request. In some cases, where temporary virtual machine instances are allocated to service provider 140, service provider 140 can release the temporary virtual machine instances when service provider 140 completes processing the update requests from endpoint systems 120.

As illustrated, data store 150 generally includes workload data 152 and push history data 154. Workload data 152 and push history data 154 may be implemented, for example, as databases or flat log files. Workload data 152 generally maintains a log of update requests processed by a service provider 140. Each update request stored in workload data 152 may be associated with, for example, an amount of time required to process the request at service provider 140, an amount of data returned for the update request, a datestamp associated with the update request, and so on. As discussed above, based on the historical data in workload data 152, push notification service 130 can determine an amount of resources that a service provider 140 needs to process subsequent requests and can adjust (e.g., accelerate or throttle) a rate at which push notification service 130 initiates update procedures at endpoint systems 120.

Push history data 154, as discussed above, generally includes log data about the endpoint systems that have received a push notification to initiate update procedures relative to an identified push event and service provider 140. Based on the endpoint systems identified in push history data 154, push notification service 130 can identify a set of endpoint systems that have not yet invoked update procedures relative to the push event and service provider 140. Push notification service 130 can determine, for example, an amount of resources to allocate to a service provider 140 and/or a rate to generate push notifications to the identified set of endpoint systems to initiate update procedures without overloading service provider 140.

Figure 2:
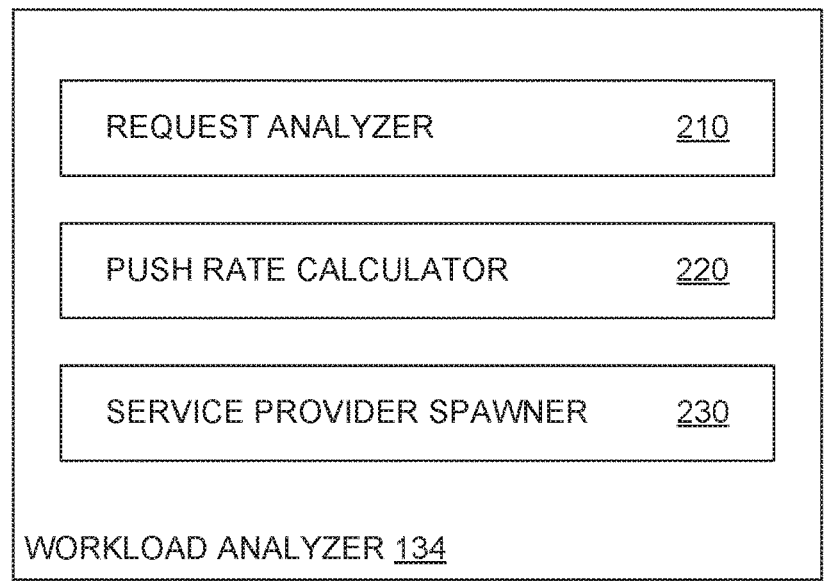
FIG. 2 illustrates an example workload analyzer, according to one embodiment.

FIG. 2 illustrates an example workload analyzer 134, according to one embodiment. As illustrated, workload analyzer 134 generally includes a request analyzer 210, a push rate calculator 220, and a service provider spawner 230.

Request analyzer 210 generally examines a push notification event to determine an expected resource utilization needed to satisfy an update request associated with the push notification event. In some cases, request analyzer 210 can examine the push notification event to determine the computational expense (e.g., processor cycles, estimated processing time, and so on) of an update request based, for example, on a number of application programming interface (API) calls and database queries associated with the update request. In some cases, request analyzer can additionally or alternatively examine the results of a request to determine the size of the update and an amount of bandwidth required to provide the update to an endpoint system 120.

In some cases, request analyzer 210 can analyze estimated resource utilization of a current request against resource utilization for a previous request. For example, request analyzer 210 can analyze the size of a result set associated with the current request with the size of a result set associated with a previous request to calculate the resources needed to satisfy the current request relative to the resources used to satisfy the previous request. In another example, request analyzer 210 can analyze the number of endpoint systems to update with the current request against the number of endpoint systems updated with the previous request to calculate a relative amount of resources needed to satisfy the current request.

Push rate calculator 220 generally uses the estimated resource usage generated by request analyzer 210 and resource availability information for a service provider 140 to determine a rate at which push notification service 130 can generate and transmit push notifications to a set of endpoint systems 120. As discussed above, the rate at which push notification service 130 can generate and transmit push notifications can be calculated to generate a number of requests to be satisfied at a service provider 140 that does not exceed, for a given time period, the amount of resources available at the service provider 140. For example, push rate calculator 220 can determine a rate for generating and transmitting push notifications to endpoint systems 120 based on a number of database queries service provider 140 can process over a given time period, a number of API requests service provider 140 can process over a given time period, an amount of data service provider 140 can output over a given time period, and so on.

In some cases, push rate calculator 220 can calculate the rate for generating push notifications based on a fraction of the resources available at a service provider 140. By calculating the rate using less than all of the resources available at a service provider 140, push rate calculator 220 can calculate a lower rate for transmitting push notifications that provides some processing headroom at service provider 140 to account for unexpected increases in an amount of resources needed to satisfy the request.

In some cases, where service provider 140 is deployed in a cluster including a fixed number of permanent machines and a variable number of temporary virtual machines, push rate calculator 220 can adjust the rate for generating and transmitting push notifications based on the current amount of computing resources available at service provider 140. As temporary virtual machines are added to the cluster associated with service provider 140, push rate calculator 220 can increase the rate for generating and transmitting push requests to endpoint systems 120. As temporary virtual machines are removed from the cluster (or as push rate calculator 220 detects termination notices indicating that temporary virtual machines are to be removed from the cluster after a set amount of time), push rate calculator 220 can decrease the rate for generating and transmitting push requests to endpoint systems 120.

Service provider spawner 230 is generally configured to use relative resource utilization data generated by request analyzer 210 to determine the number of machines to allocate (or request for allocation) to a service provider 140. Service provider spawner 230 can determine the number of machines to allocate (or request for allocation) by multiplying the relative number calculated at request analyzer 210 with the number of machines allocated for a previous request executed by service provider 140. In some cases, service provider spawner 230 can modify the number of machines to allocate (or request for allocation) if a system administrator wishes to change the speed of an update process. For example, service provider spawner 230 can request additional virtual machine instances if a system administrator wishes to accelerate an update process. Likewise, if a system administrator wishes to decelerate an update process, service provider spawner 230 can request fewer virtual machine instances for service provider 140.

Figure 3:
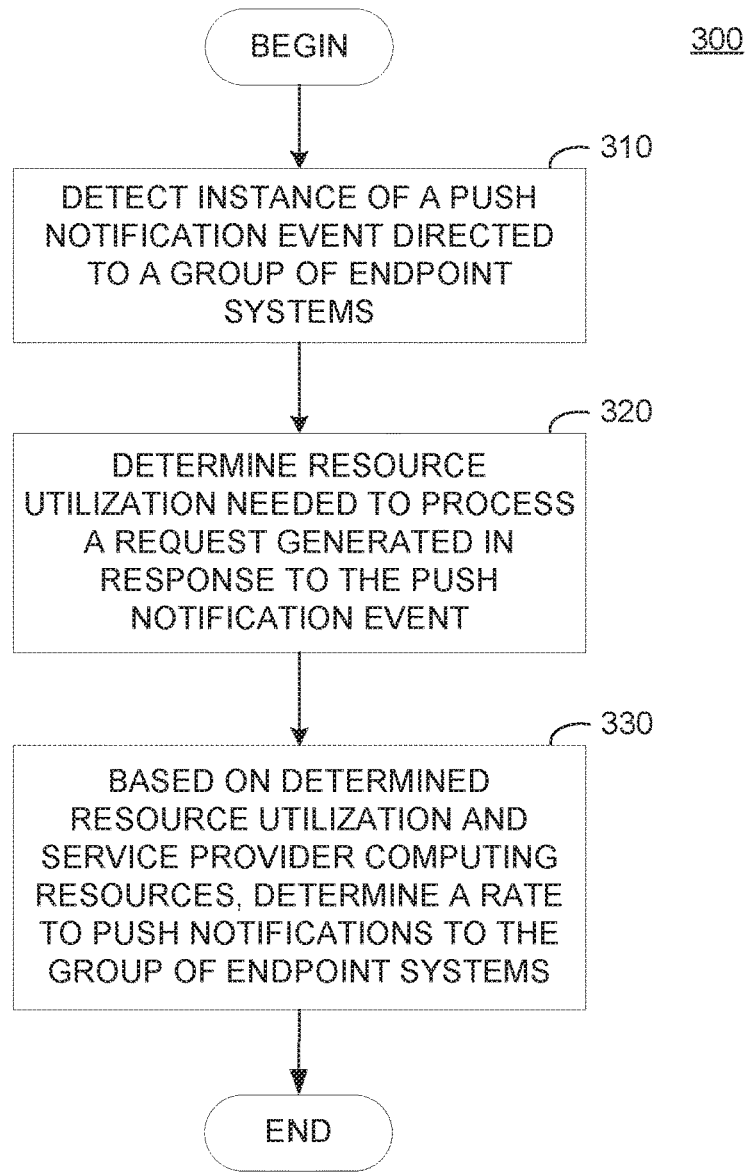
FIG. 3 illustrates example operations for determining a rate to generate push notifications based on resource utilization for processing a request associated with the push notification, according to one embodiment.

FIG. 3 illustrates example operations 300 that may be performed to determine a rate for generating and transmitting push notifications to a group of endpoint systems, according to one embodiment.

As illustrated, operations 300 start at step 310, where a push notification service 130 detects an instance of a push notification event directed to a group of endpoint systems 120. As discussed above, a push notification system can detect an instance of a push notification event, for example, by detecting update availability messages transmitted from a service provider 140. The update availability message may include, for example, data identifying the service provider 140 associated with the update availability message, computing resources available at the service provider 140, and so on.

At step 320, push notification service 130 determines the resource utilization needed to process a request generated in response to the push notification event. The determined resource utilization may be based, for example, on a number of API calls performed by the request, a number of database queries executed for the request, a size of the data set generated by the request, and so on.

At step 330, push notification service 130 determines a rate to push notifications to the group of endpoint systems. Push notification service 130 generally determines the rate based on the number of requests that service provider 140 can process over a specified amount of time. For example, push notification service 130 can determine a maximum number of requests by taking the lowest number of requests that can be satisfied according to various performance metrics for the service provider 140 to prevent overloading of the servers associated with service provider 140. For example, push notification system can determine the maximum number of requests that service provider 140 can process based on API calls processed per second, database queries processed per second, available bandwidth, and so on. In some cases, push notification service 130 may calculate the maximum number of requests that service provider 140 can process using a fraction of the resources available at service provider 140, which may provide additional resource headroom for processing requests at service provider 140.

Figure 4:
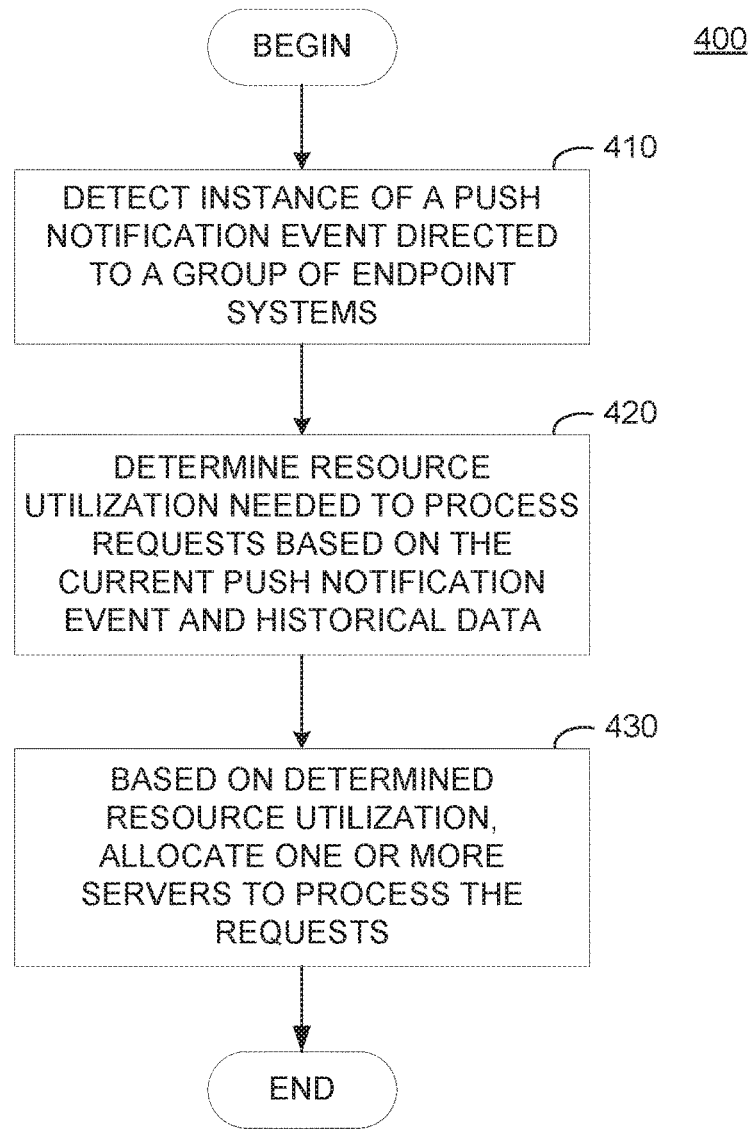
FIG. 4 illustrates example operations for determining an amount of resources to allocate to processing a request associated with a push notification based on historical data, according to one embodiment.

FIG. 4 illustrates example operations 400 that may be performed by a push notification service 130 to determine a number of virtual machine instances to allocate (or request for allocation) to a service provider 140, according to one embodiment.

As illustrated, operations 400 begin at step 410, where a push notification service 130 detects an instance of a push notification event directed to a group of endpoint systems 120.

At step 420, push notification service 130 determines a resource utilization needed to process requests associated with the push notification event based on the current push notification event and historical data. As discussed above, push notification service 130 can determine the resource utilization for the current push notification event as an amount relative to the resources used in processing a previous request. For example, push notification service 130 can determine that fewer resources are needed to respond to a request that generates a smaller result set than a previous request that generated a larger result set. In another example, push notification service 130 can determine that additional resources may be requested to respond to a request generated by a larger set of endpoint systems 120 than the resources used to respond to previous requests generated by a smaller set of endpoint systems 120.

At step 430, push notification service 130 allocates one or more servers to process the requests based on the determined resource utilization. As discussed above, push notification service 130 can request allocation of a determined number of servers (e.g., virtual machine instances) from a pool of dynamically allocated servers in a cloud platform. In some cases, push notification service 130 can further modify the number of servers allocated to process the requests based on target completion times set by a system administrator. For example, for smaller target completion times, push notification service 130 can request allocation of additional servers from the pool, while for more relaxed target completion times, push notification service 130 can decrease the number of servers requested from the pool.

Figure 5:
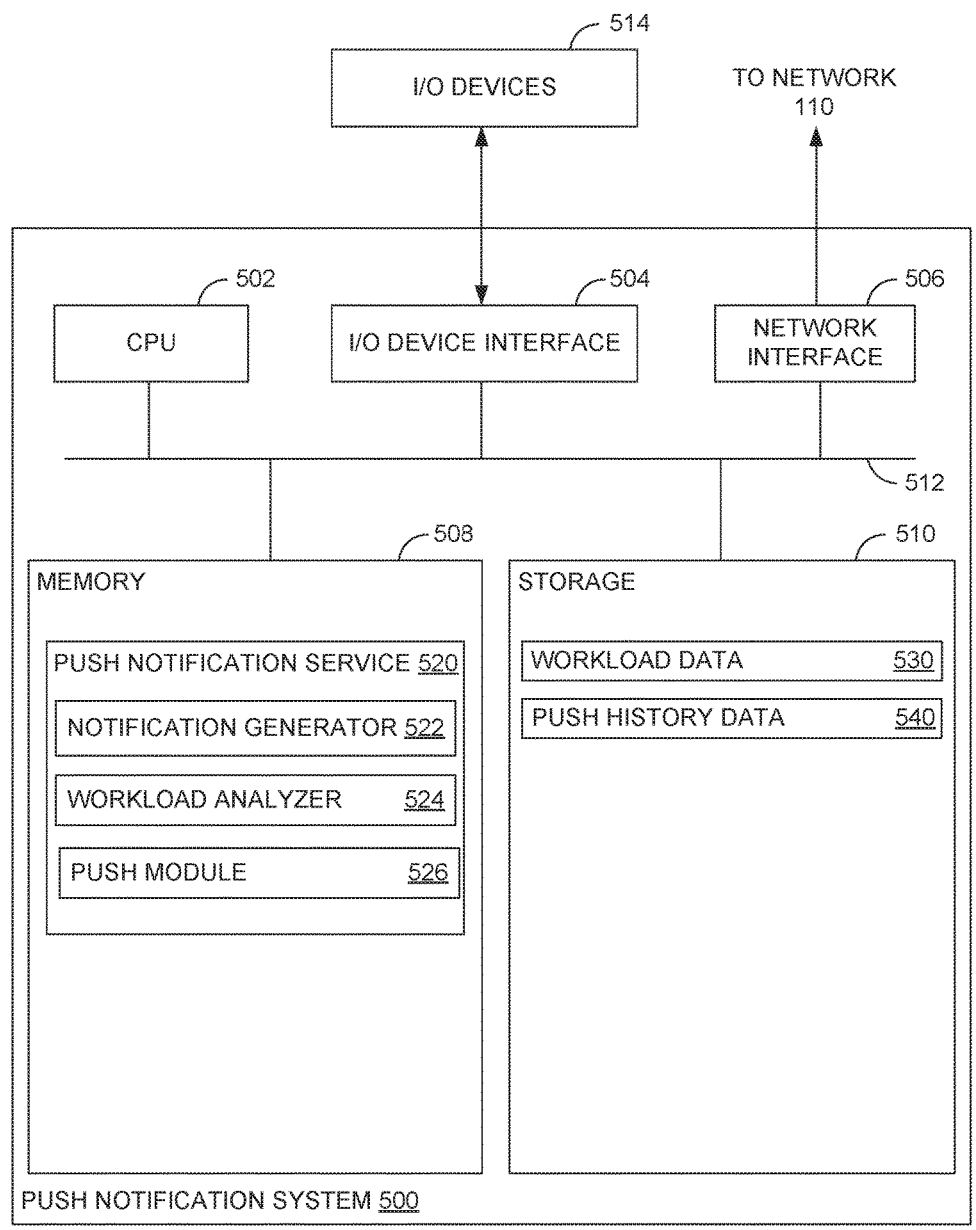
FIG. 5 illustrates an example computing system for generating push notifications based on resource utilization for processing requests associated with a push notification and available resources at a service provider, according to one embodiment.

FIG. 5 illustrates an example push notification system 500 that uses resource utilization information associated with push requests to model a workload for a push request and adjust a rate for generating push requests, according to an embodiment. As shown, the endpoint system 500 includes, without limitation, a central processing unit (CPU) 502, one or more I/O device interfaces 504 which may allow for the connection of various I/O devices 514 (e.g., keyboards, displays, mouse devices, pen input, etc.) to the endpoint system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a push notification service 520. Push notification service 520 generally includes a notification generator 522, a workload analyzer 524, and a push module 526. As discussed above, notification generator 522 generally receives messages (e.g., through network interface 506) indicating that updates are available at a service provider 140 and that endpoint systems should request the updated data from the service provider 140. In some cases, the message may identify the service provider 140, computing resources available at the service provider 140, a datestamp associated with the updated data, and so on.

Workload analyzer 524 is generally configured to determine the amount of computing resources needed to process a request associated with a push notification. The amount of computing resources needed to process the request may be calculated based on, processor cycles, a number of database queries or API calls generated for the request, a size of the data set returned by the request, and so on. Workload analyzer 524 can compare the amount of computing resources needed to process the request to the amount of computing resources available at a service provider 140 to determine the number of requests that service provider 140 can process in a given time period. As discussed above, workload analyzer 524 can calculate the number of requests that service provider 140 can process based on a variety of metrics (e.g., API calls processed per second, database queries processed per second, available bandwidth, and so on) and choose the smallest number of requests processed in the given time period to avoid overloading the cluster of servers associated with service provider 140.

In some cases, workload analyzer 524 may be additionally configured to determine a number of servers to allocate to a service provider 140 based on comparisons between estimated computing resource requirements for a current request and resource requirements associated with previous requests. As discussed above, workload analyzer 524 can determine the amount of computing resources needed by a current request relative to a previous request. Based on historical server usage data and the determined relative amount of computing resources, workload analyzer 524 can request the allocation of a number of servers commensurate with the computing resources needed to satisfy the current request in the same or similar amount of time as the previous request.

Push module 526 is generally configured to generate and transmit push notifications to one or more endpoint systems 120 via network interface 506. Push module 526 can generate and transmit push notifications based on the rate calculated by workload analyzer 524. In some cases, to maintain a log of the systems that have received the push notification, push module may write endpoint system identifiers to push history data 540 in storage 510. By maintaining the log, push module 526 can generate usage data that workload analyzer 524 can use to determine a number of servers or virtual machines to allocate to subsequent iterations of processing the same request.

As shown, storage 510 includes workload data 530 and push history data 540. Workload data 530 generally includes information about the resources used (e.g., number of servers/virtual machine instances, elapsed time, and so on) to satisfy requests from endpoint systems 120 associated with a push notification event. Workload analyzer 524 can use the historical performance data in workload data 530, for example, to calculate the amount of resources needed to respond to the same or similar data requests at a later date. Push history data 540 generally includes log information indicating that specified endpoint systems 120 have received a push notification related to a push notification event. Push history data 540 can generally associate a unique identifier of an endpoint system 120 with an identifier of a push notification event. Push notification service 520 can use the data in push history data 540 to identify endpoint systems 120 that are to be updated and to calculate an amount of computing resources needed to propagate the update to the identified endpoint systems 120.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for managing a rate of generating data requests to be processed at a service provider, comprising:
  detecting an instance of a push notification event directed to a group of endpoint systems, the push notification event indicating that push notifications are to be transmitted to the group of endpoint systems to generate the data requests;
  determining a resource utilization associated with at least one of the data requests generated in response to expected receipt of the push notification event at the group of endpoint systems;
  determining a push notification transmission rate based on the determined resource utilization and computing resources available at the service provider, the rate indicating a number of push notifications to generate and transmit over a period of time; and
  transmitting the push notifications to the group of endpoint systems based on the calculated push notification transmission rate.

2. The method of claim 1, wherein detecting the instance of the push notification event comprises receiving a message from the service provider indicating that data to be provided to the group of endpoint systems is available at the service provider.

3. The method of claim 1, wherein determining the resource utilization associated with the at least one data request comprises determining a number of database queries generated in processing the at least one data request.

4. The method of claim 1, wherein determining the resource utilization associated with the at least one data request comprises determining a size of a result set generated in response to the at least one data request.

5. The method of claim 1, further comprising:
determining, based on historical data and one or more characteristics of the data requests generated by the endpoint systems, an amount of computing resources to allocate at the service provider.

6. The method of claim 5, wherein the historical data comprises an association of an amount of computing resources allocated to processing a previous data request and an amount of data generated for the previous data request.

7. The method of claim 5, wherein the historical data comprises an association of an amount of computing resources allocated to processing a previous data request and a number of endpoint systems that generated the previous data request.

8. The method of claim 7, wherein the historical data further includes identifiers for each of the number of endpoint systems that generated the previous data request, and wherein the group of endpoint systems is identified based, at least in part, on identifiers of endpoint systems not found in the historical data.

9. A system, comprising:
a processor; and
a memory comprising instructions which, when executed on the processor, perform operations for managing a rate of generating data requests to be processed at a service provider, the operations comprising:
detecting an instance of a push notification event directed to a group of endpoint systems, the push notification event indicating that push notifications are to be transmitted to the group of endpoint systems to generate the data requests;
determining a resource utilization associated with at least one of the data requests generated in response to expected receipt of the push notification event at the group of endpoint systems;
determining a push notification transmission rate based on the determined resource utilization and computing resources available at the service provider, the rate indicating a number of push notifications to generate and transmit over a period of time; and
transmitting the push notifications to the group of endpoint systems based on the calculated push notification transmission rate.

10. The system of claim 9, wherein detecting the instance of the push notification event comprises receiving a message from the service provider indicating that data to be provided to the group of endpoint systems is available at the service provider.

11. The system of claim 9, wherein determining the resource utilization associated with the at least one data request comprises at least one of:
determining a number of database queries generated in processing the at least one data request; or
determining a size of a result set generated in response to the at least one data request.

12. The system of claim 9, wherein the operations further comprise:
determining, based on historical data and one or more characteristics of the requests generated by the endpoint systems, an amount of computing resources to allocate at the service provider.

13. The system of claim 12, wherein the historical data comprises at least one of:
an association of an amount of computing resources allocated to processing a previous data request and an amount of data generated for the previous data request; or
an association of an amount of computing resources allocated to processing a previous data request and a number of endpoint systems that generated the previous request.

14. The system of claim 13, wherein the historical data further includes identifiers for each of the number of endpoint systems that generated the previous data request, and wherein the group of endpoint systems is identified based, at least in part, on identifiers of endpoint systems not found in the historical data.

15. A non-transitory computer-readable medium comprising instructions which, when executed on one or more processors, perform operations for managing a rate of generating data requests to be processed at a service provider, the operations comprising:
detecting an instance of a push notification event directed to a group of endpoint systems, the push notification event indicating that push notifications are to be transmitted to the group of endpoint systems to generate the data requests;
determining a resource utilization associated with at least one of the data requests generated in response to expected receipt of the push notification event at the group of endpoint systems;
determining a push notification transmission rate based on the determined resource utilization and computing resources available at the service provider, the rate indicating a number of push notifications to generate and transmit over a period of time; and
transmitting the push notifications to the group of endpoint systems based on the calculated push notification transmission rate.

16. The non-transitory computer-readable medium of claim 15, wherein detecting the instance of the push notification event comprises receiving a message from the service provider indicating that data to be provided to the group of endpoint systems is available at the service provider.

17. The non-transitory computer-readable medium of claim 15, wherein determining the resource utilization associated with the at least one data request comprises at least one of:
determining a number of database queries generated in processing the at least one data request; or
determining a size of a result set generated in response to the at least one data request.

18. The non-transitory computer-readable medium of claim 15, wherein the operations further comprise:
determining, based on historical data and one or more characteristics of the requests generated by the endpoint systems, an amount of computing resources to allocate at the service provider.

19. The non-transitory computer-readable medium of claim 18, wherein the historical data comprises at least one of:
an association of an amount of computing resources allocated to processing a previous data request and an amount of data generated for the previous data request; or
an association of an amount of computing resources allocated to processing a previous data request and a number of endpoint systems that generated the previous request.

20. The non-transitory computer-readable medium of claim 19, wherein the historical data further includes identifiers for each of the number of endpoint systems that generated the previous data request, and wherein the group of endpoint systems is identified based, at least in part, on identifiers of endpoint systems not found in the historical data.

\* \* \* \* \*